(12) United States Patent  
Wellbrock et al.

(10) Patent No.: US 7,711,267 B2  
(45) Date of Patent: May 4, 2010

(54) REMOTE MANAGEMENT OF CENTRAL OFFICE OPERATIONS

(75) Inventors: Glenn Wellbrock, Wylie, TX (US); Tiejun Xia, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1008 days.

(21) Appl. No.: 11/239,330

(22) Filed: Sep. 30, 2005

(65) Prior Publication Data

US 2007/0077067 A1   Apr. 5, 2007

(51) Int. Cl.  
*H04B 10/08* (2006.01)  
*H04J 14/00* (2006.01)

(52) U.S. Cl. .............. 398/33; 398/9; 398/17; 398/45

(58) Field of Classification Search .......... 398/1, 398/5, 9, 10, 13, 16, 17, 20, 21, 31, 33, 45, 398/48–50  
See application file for complete search history.

(56) References Cited

U.S. PATENT DOCUMENTS

| 7,127,171 B2 * | 10/2006 | Martin et al. ............ 398/83 |
| 2003/0202734 A1 | 10/2003 | Dames et al. |
| 2005/0238355 A1 * | 10/2005 | Leite et al. ............ 398/58 |

OTHER PUBLICATIONS www.glimmerglass.com, Glimmerglass "Intelligent Optical Switches" print date Sep. 7, 2005 (2 pages).

* cited by examiner

*Primary Examiner*—Dalzid Singh

(57) ABSTRACT

In one implementation, a system detects that a fiber within a fiber optic cable has failed and automatically causes a location of a faulty portion of the fiber to be identified in response to the detecting. In another implementation, a central office includes a first optical patch panel operably coupled to an optical fiber and a second optical patch panel configured to couple the first optical patch panel to a test device. The optical fiber is automatically coupled to the test device in response to one or more signals from a remote management device.

22 Claims, 12 Drawing Sheets

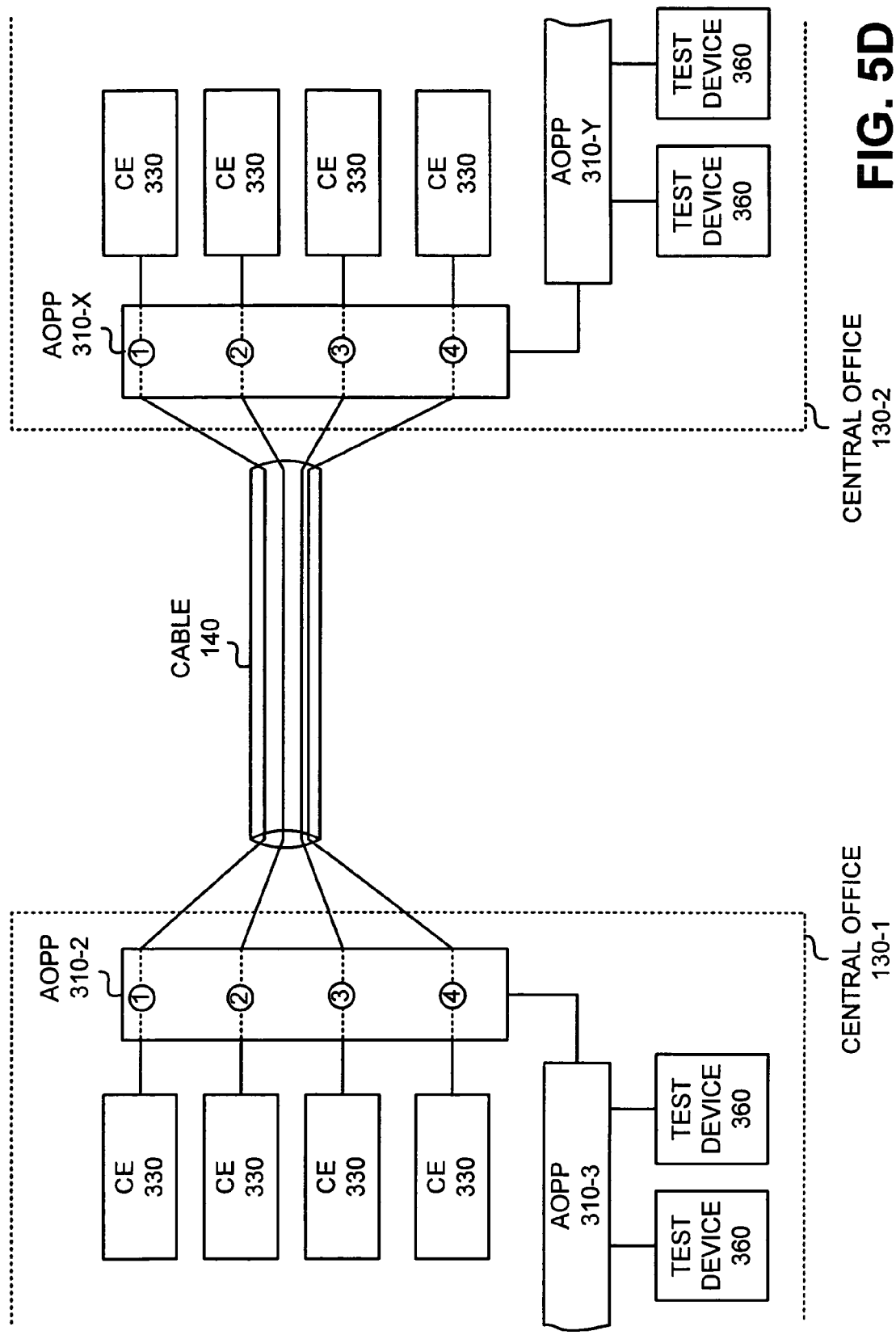

REMOTE MANAGEMENT OF CENTRAL OFFICE OPERATIONS

FIELD OF THE INVENTION

Implementations consistent with the principles of the invention relate generally to communications networks and, more particularly, to the remote management of central office operations.

BACKGROUND OF THE INVENTION

A central office typically includes a single manual optical patch panel for managing connections between fiber cables coming into the central office and the routing devices within the central office. If the optical patch panel fails, the central office may become inoperable.

Moreover, repair of damaged fibers in a central office implementing a single manual patch panel is a labor intensive process. The repair process often involves sending repair personnel to the central offices at both ends of the damaged fiber. The repair personnel identify the location of the damaged fiber in the manual optical patch panel and then manually connect the damaged fiber to a test device, such as an optical time domain reflectometer, to determine the location of the damage along the fiber. Once the location is identified, a splice crew is sent to the location to repair the damaged fiber. After the fiber has been repaired, the repair personnel at the two central offices remeasure the fiber with the optical time domain reflectometer to determine whether the fiber has been properly repaired. If the fiber has been repaired, the repair personnel manually reconnect the fiber back to its original location in the manual patch panel. This repair process is not only labor intensive, but also prone to errors (e.g., a repair person may mistakenly put the fiber back into a different location in the manual patch panel).

SUMMARY OF THE INVENTION

In an implementation consistent with the principles of the invention, a method includes detecting that a fiber within a fiber optic cable has failed, and automatically causing a location of a faulty portion of the fiber to be identified in response to the detecting.

In another implementation consistent with the principles of the invention, a central office includes a group of first automatic optical patch panels (AOPP). Each AOPP includes a group of optical switches, where each optical switch is operably connected to a single, different optical cable associated with the central office.

In a system including an optical patch panel and an optical splitter, a method includes identifying traffic through the optical patch panel to be moved, where the traffic is transmitted over a first fiber; switching the identified traffic through the optical splitter, where the switching causes the traffic to be transmitted over the first fiber and a second fiber; verifying a presence of the traffic on the second fiber; and switching the traffic to the second fiber.

In a further implementation consistent with the principles of the invention, a central office includes an optical patch panel operably coupled to an optical fiber and a second optical patch panel configured to couple the first optical patch panel to a test device. The optical fiber is automatically coupled to the test device in response to one or more signals from a remote management device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5A-5D illustrate an exemplary implementation of the processing described in FIG. 4 in an implementation consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide remote management of central office operations. In one implementation, a central office is provided with automatic optical patch panels (AOPPs) that allow for remote surveillance of the fibers associated with the central office and remote testing of those fibers. In addition, a splitter may be associated with an AOPP to allow for a bridge and roll capability.

Exemplary System

Figure 1:
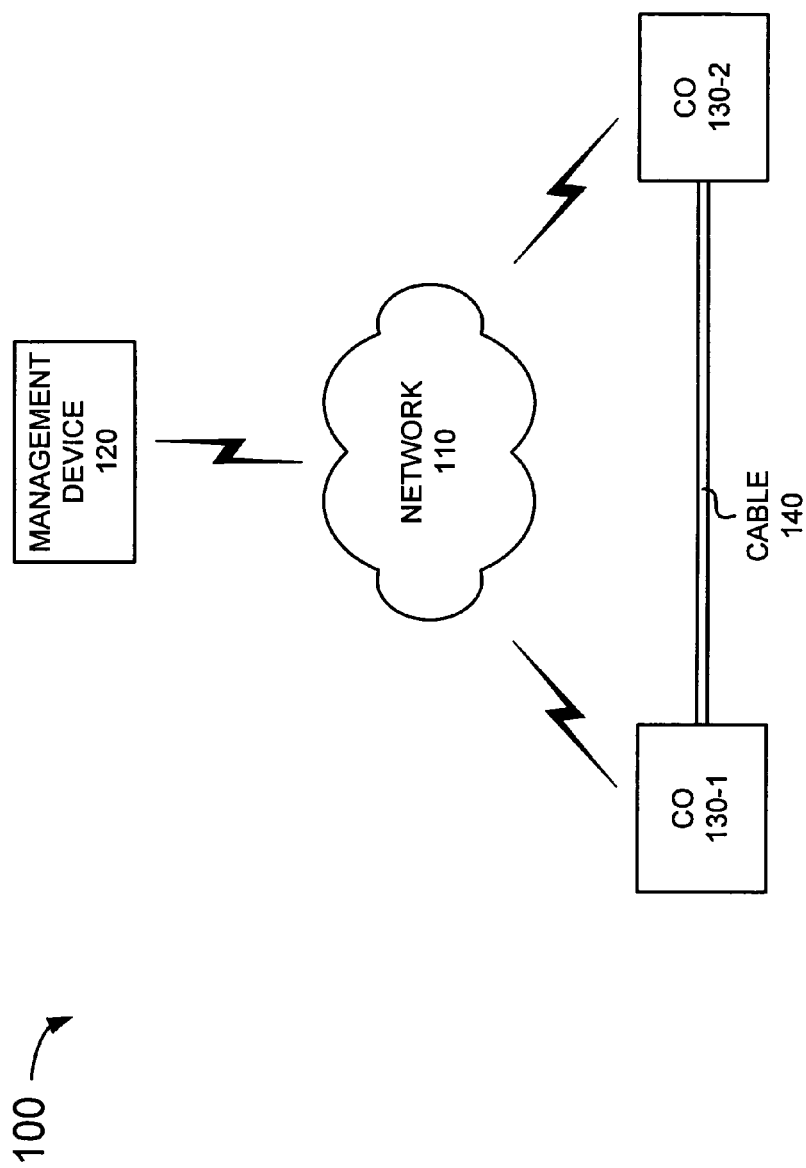
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a management device 120 that connects to a group of central offices 130-1 and 130-2 (referred to collectively as "central offices 130") via a network 110. The number of management devices 120 and central offices 130 illustrated in FIG. 1 is provided for simplicity. In practice, a typical system could include more or fewer management devices 120 and central offices 130 than illustrated in FIG. 1.

Network 110 may include a local area network (LAN), a wide area network (WAN), a telephone network, such as the Public Switched Telephone Network (PSTN), an intranet, the Internet, or a combination of these networks or other networks. Management device 120 may include any type of device capable of providing remote surveillance and control of operations at central offices 130. In one implementation, management device 120 may include one or more devices, such as personal computers, mainframe computers, servers, lap tops, personal digital assistants (PDAs), wireless telephones, etc., threads or processes running on these devices or other types of devices, and/or objects executable by these devices.

Central offices 130 may include local telephone company switching centers that receive and direct telephone calls and data transmissions to their appropriate destinations. As described below, central offices 130 may be monitored and remotely tested by management device 120. As illustrated in FIG. 1, central office 130-1 may connect to central office 130-2 via a cable 140. In one implementation consistent with the principles of the invention, cable 140 may include a fiber optic cable that includes a group of individual fibers.

Management device 120 may connect to network 110 via wired, wireless, and/or optical connections. Similarly, central offices 130 may connect to network 110 via wired, wireless, and/or optical connections.

Management Device Configuration

Figure 2:
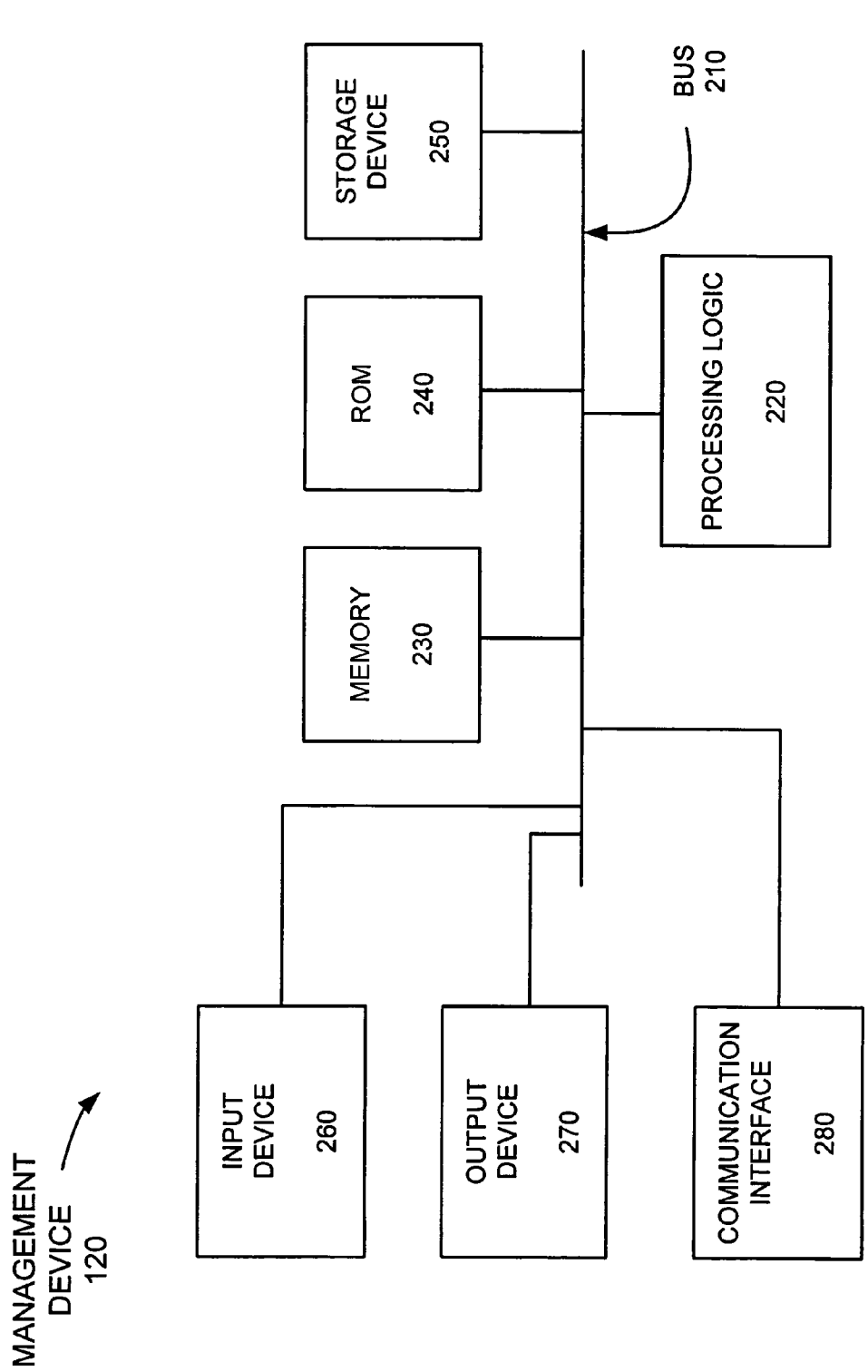
FIG. 2 illustrates an exemplary configuration of the management device of FIG. 1 in an implementation consistent with the principles of the invention.

FIG. 2 illustrates an exemplary configuration of management device 120 in an implementation consistent with the principles of the invention. As illustrated, management device 120 may include a bus 210, processing logic 220, a memory 230, a read only memory (ROM) 240, a storage device 250, an input device 260, an output device 270, and a communications interface 280. It will be appreciated that management device 120 may include other components (not shown) that aid in receiving, transmitting, and/or processing data.

Bus 210 may permit communication among the components of management device 120. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that may store information and instructions for execution by processing logic 220. ROM may include a conventional ROM device and/or another type of static storage device that may store static information and instructions for processing logic 220. Storage device 250 may include a type of magnetic or optical recording medium and its corresponding drive for storing information and/or instructions.

Input device 260 may include a device that permits an operator to input information to management device 120, such as a keyboard, a keypad, a mouse, a pen, a microphone, one or more biometric mechanisms, or the like. Output device 270 may include a device that outputs information to the operator, including a display, a printer, a speaker, etc.

Communication interface 280 may include any transceiver-like mechanism that enables management device 120 to communicate with other devices and/or systems. For example, communication interface 280 may include mechanisms for communicating with central offices 130 via a network, such as network 110.

As will be described in detail below, management device 120, consistent with the principles of the invention, may perform remote monitoring and testing of central offices 130. Management device 120 may perform these and other operations in response to processing logic 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Central Office Configuration

Figure 3:
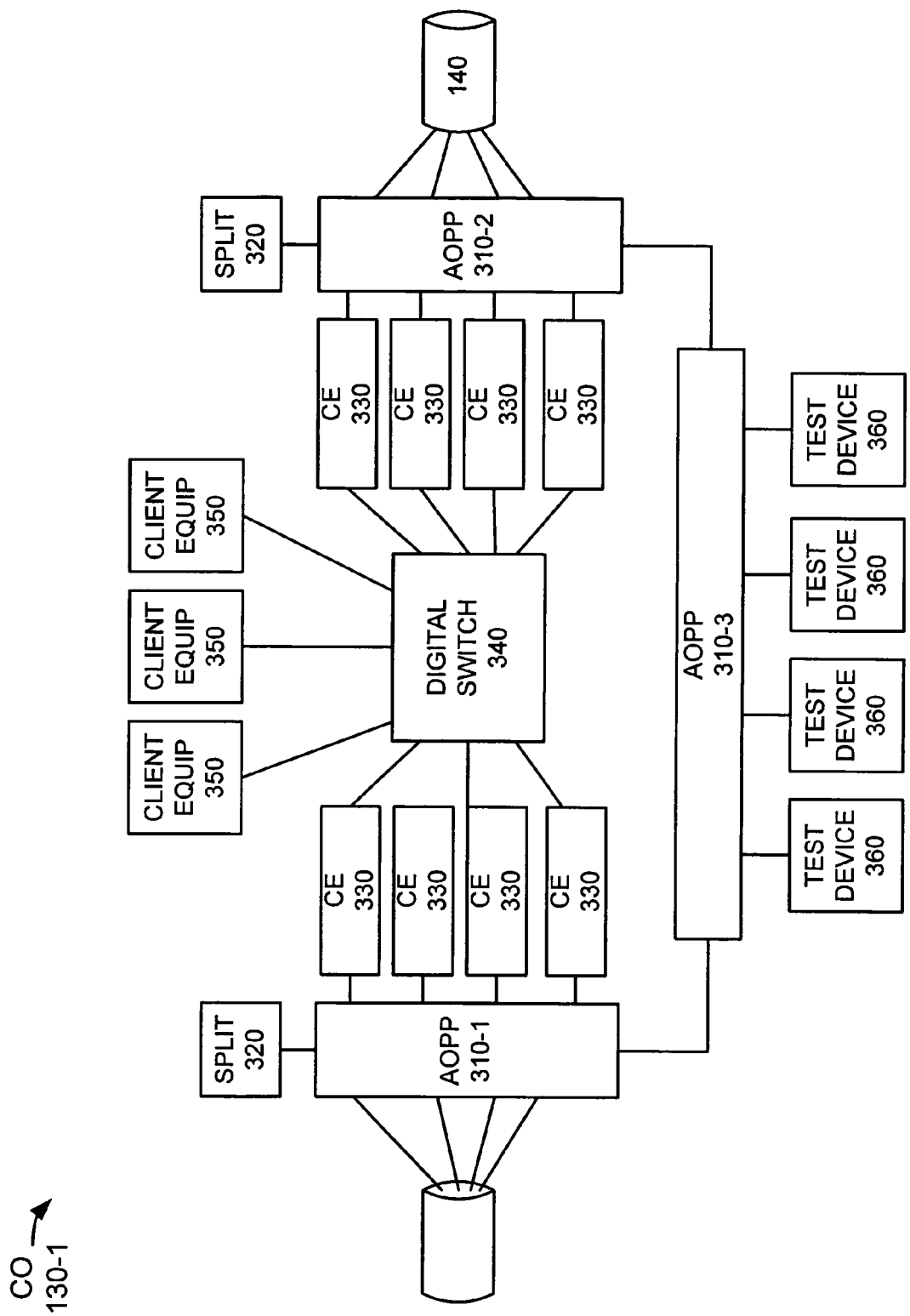
FIG. 3 illustrates an exemplary configuration of a central office of FIG. 1 in an implementation consistent with the principles of the invention.

FIG. 3 illustrates an exemplary configuration of central office 130-1 in an implementation consistent with the principles of the invention. It will be appreciated that central office 130-2 may be similarly configured. As illustrated, central office 130-1 may includes automatic optical patch panels (AOPPs) 310-1 through 310-3 (referred to collectively as "AOPPs 310"), splitters 320, carrier equipment (CE) 330, a digital switch 340, client equipment 350, and test devices 360. The number of devices illustrated in FIG. 3 is provided for simplicity. In practice, a typical central office could include more or fewer AOPPs 310, splitters 320, carrier equipment 330, digital switches 340, client equipment 350, and/or test devices 360 than illustrated in FIG. 3. Moreover, central office 130-1 may include other devices than illustrated in FIG. 3 that aid in receiving, processing, and/or transmitting signals.

AOPPs 310 may include N×M optical switches that receive signals on input ports and switch the signals to the appropriate output ports. In one implementation, AOPPs 310 may, for example, include low-loss photonic switch modules produced by Polatis Ltd., Continuum Photonics, Inc., or other similar types of photonic switch modules. AOPPs 310-1 and 310-2 switch signals between the individual fibers of a fiber cable, such as cable 140, and carrier equipment 330. In one implementation, AOPPs 310-1 and 310-2 may include one switch for every fiber cable with which central office 130-1 is associated. Therefore, if a switch within an AOPP were to fail, the central office 130-1 may route traffic around the failed switch. Moreover, since central office 130-1 includes multiple AOPPs 130, the failure of a single AOPP does not render central office 130-1 inoperable. Two fiber cables are illustrated as associated with central office 130-1 in FIG. 3 for explanatory purposes only. It will be appreciated that central office 130-1 (and AOPPs 130-1 and 130-2) may be associated with more or fewer fiber cables. AOPP 310-3 switches signals between AOPPs 310-1 and 310-2 and test devices 360. In this manner, AOPP 310-3 allows an individual fiber associated with AOPP 310-1 or 310-2 to be connected to one or more test devices 360 for testing purposes.

Splitters 320 may include one or more devices that split a single input optical signal into two identical output optical signals. In one implementation, splitters 320 may include 3 decibel (dB) splitters. As will be described in additional detail below, splitters 320 may provide AOPPs 310-1 and 310-2 with branch and roll capabilities.

Carrier equipment 330 may include devices for formatting signals transmitted between AOPPs 310-1 and 310-2 and digital switch 340. In one implementation, carrier equipment 330 may, for example, perform optical-to-electrical conversions, electrical-to-optical conversions, wavelength division multiplexing, etc. Carrier equipment 330 may include bi-directional wavelength division multiplexing (BDWM) and/or ultra long haul (ULH) components.

Digital switch 340 may include one or more devices that perform time-division-multiplexed switching of digitized signals. Digital switch 340 may receive signals from client equipment 350 and forward the signals to carrier equipment 330 in a well-known manner. Also, digital switch 340 may receive signals from carrier equipment 330 and forward the signals to other carrier equipment 330 or client equipment 350 in a well-known manner.

Client equipment 350 may include one or more transport-type devices. For example, client equipment 350 may include an add-drop multiplexer (ADM), layer 2 switches, Internet Protocol (IP) switches, or the like.

Test devices 360 may include one or more devices for testing optical fibers within a cable associated with central office 130-1 to determine whether the optical fibers are functioning properly and/or to identify a location of faults within the optical fibers. In one implementation consistent with the principles of the invention, test devices 360 may include, for example, an optical time domain reflectometer (OTDR), an optical spectrum analyzer, a bit error rate tester (BERT), a signal generator, and/or any other equipment that may aid in determining whether the optical fibers are functioning properly and/or to identify a location of faults within the optical fibers.

Exemplary Processing

Figure 4:
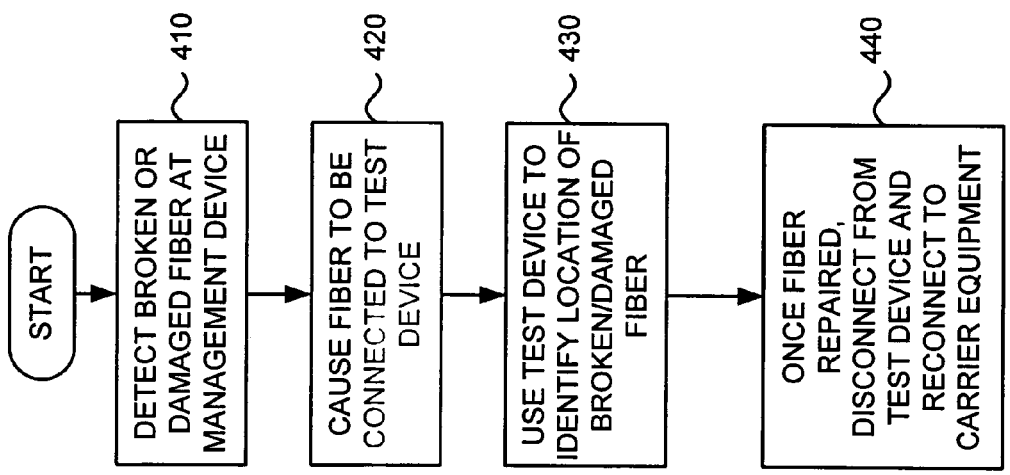
FIG. 4 illustrates an exemplary process for repairing a broken or damaged fiber in an implementation consistent with the principles of the invention.

FIG. 4 illustrates an exemplary process for repairing a broken or damaged fiber in an implementation consistent with the principles of the invention. Processing may begin with management device 120 (FIG. 1) detecting that a fiber is broken or damaged (act 410). Management device 120 may monitor the operating condition of each of the fibers associated with a central office, such as central office 130-1. The lack of a signal on a fiber may be an indication that the fiber has been broken or damaged. In such a situation, an alert may be generated at management device 120 that identifies the problematic fiber. Assume, for explanatory purposes, that the fiber is part of cable 140 that connects central offices 130-1 and 130-2 (FIG. 1) and that the fiber connects to AOPP 310-2 (FIG. 3) in central office 130-1 and AOPP 310-X in central office 130-2.

Management device 120 may cause the identified fiber to be connected to a test device 360 (act 420). To do so, management device 120 may, for example, send a signal to AOPP 310-2 instructing AOPP 310-2 to disconnect the fiber from carrier equipment 330 and connect the fiber to AOPP 310-3. Management device 120 may further send a signal to AOPP 310-3 instructing AOPP 310-3 to connect the fiber to a particular test device 360 (e.g., an optical time domain reflectometer). Similarly, management device 120 may send a signal to AOPPs within central office 130-2 to disconnect the fiber from its carrier equipment 330 and connect the fiber to, for example, an optical time domain reflectometer. Management device 120 may send these signals automatically (e.g., in response to the detection of a loss of signal on a fiber) or in response to input from an administrator associated with management device 120.

Test device 360 may then be used to identify the location of the fiber break or damage in a well known manner (act 430). For example, by connecting an optical time domain reflectometer to both ends of the fiber (i.e., at central offices 130-1 and 130-2), the location of the break between central office 130-1 and 130-2 may be identified. Once the location of the break or damage has been identified, a repair crew may be sent to the identified location to repair the fiber.

Once the fiber has been repaired, as will be detected by the test devices at central offices 130-1 and 130-2, management device 120 may cause the fiber to be disconnected from test devices 360 at central offices 130-1 and 130-2 and reconnected to the appropriate carrier equipment 330 (act 440). For example, management device 120 may send a signal to AOPP 310-2 instructing AOPP 310-2 to disconnect the fiber from AOPP 310-3 and re-connect the fiber to carrier equipment 330. Management device 120 may send a similar signal to AOPP-X within central office 130-2.

Figure 5A:
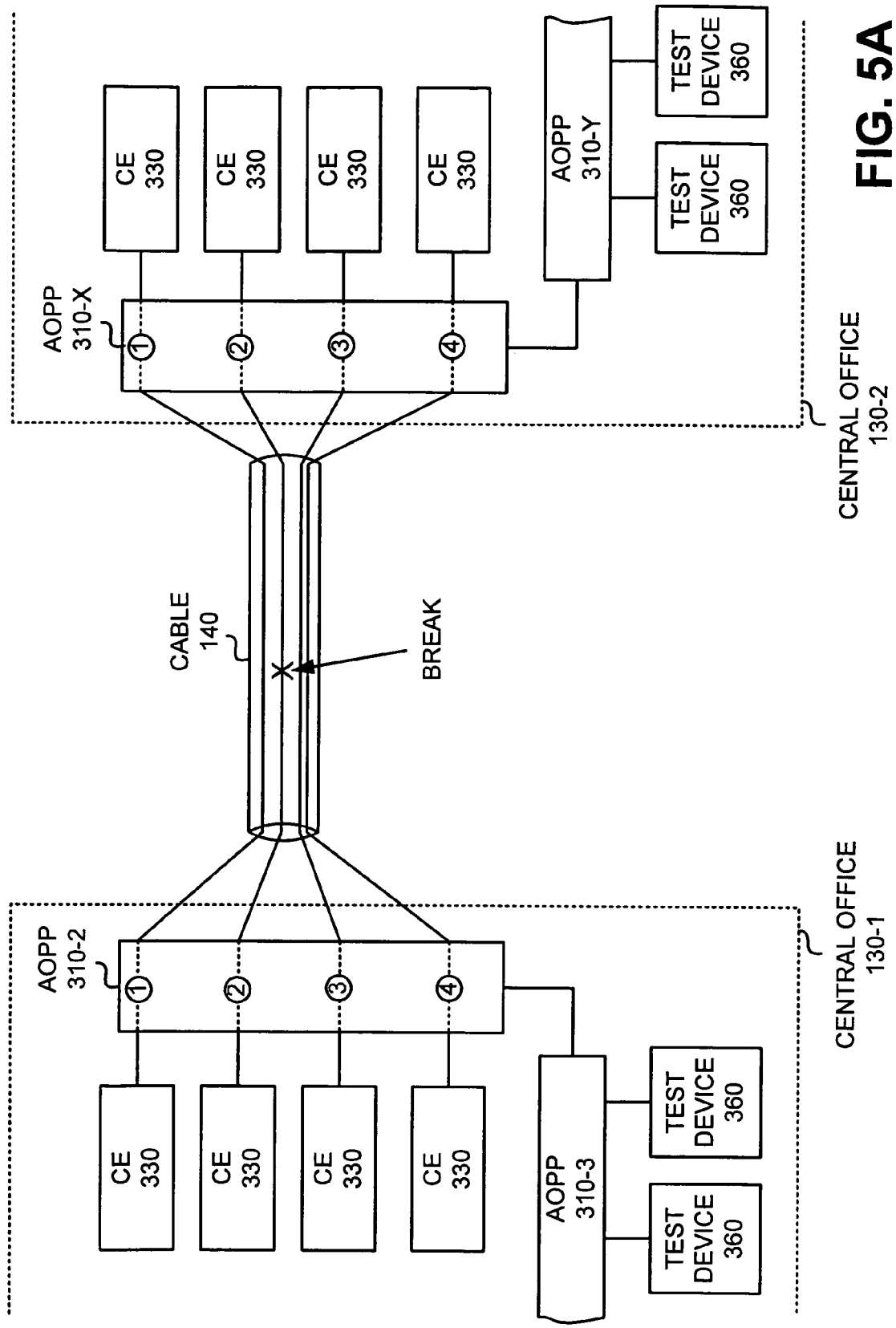
Figure 5B:
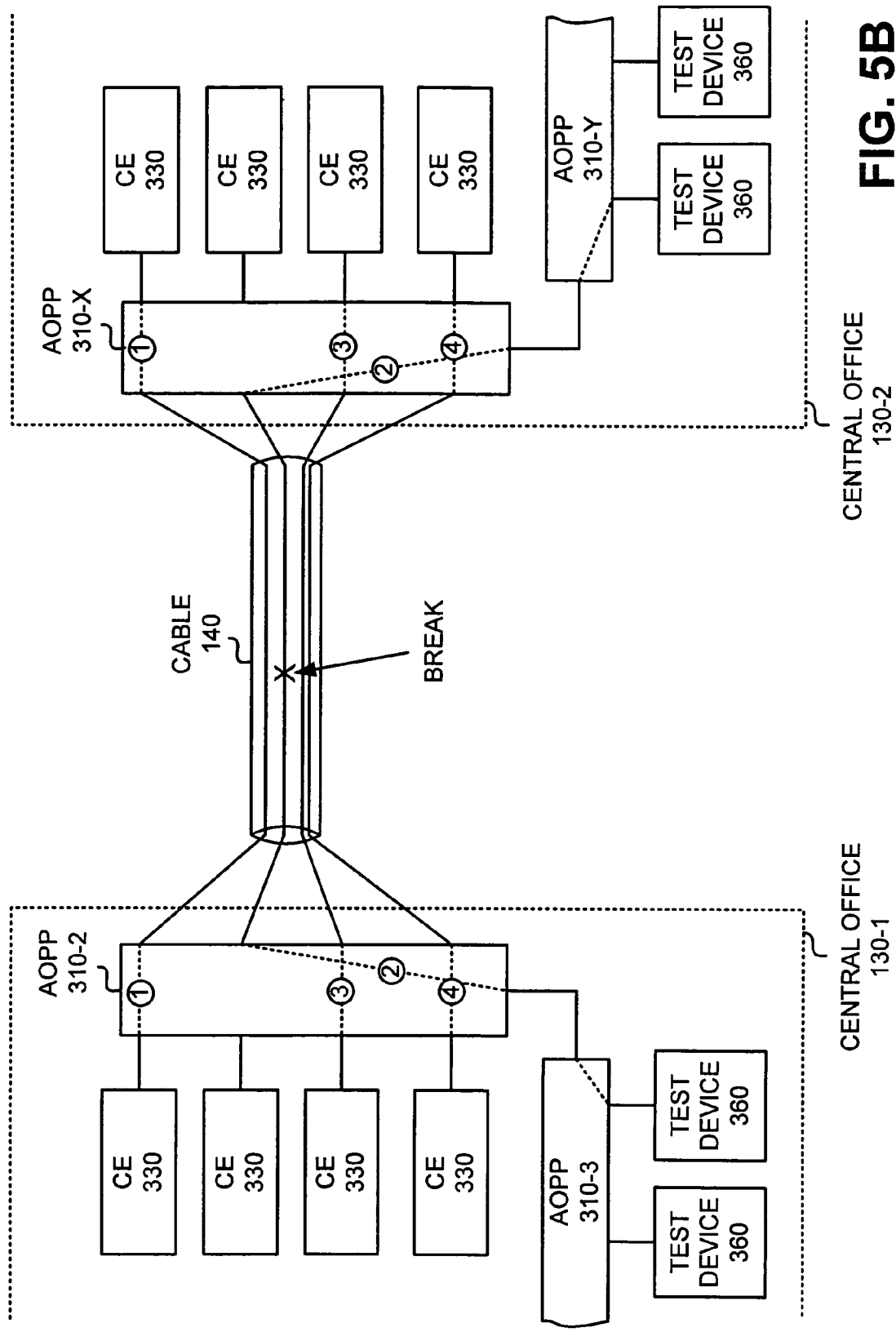

The following example illustrates the processing described above with respect to FIG. 4. As illustrated in FIG. 5A, assume that a break has been detected in fiber 2 in cable 140 that connects central office 130-1 to central office 130-2. In response, management device 120 may cause fiber 2 to be connected to test devices 360 at central offices 130-1 and 130-2, as illustrated in FIG. 5B. To do so, management device 120 may, for example, send a signal to AOPP 310-2 instructing AOPP 310-2 to disconnect fiber 2 from carrier equipment 330 and connect fiber 2 to AOPP 310-3. Management device 120 may further send a signal to AOPP 310-3 instructing AOPP 310-3 to connect fiber 2 to a particular test device 360 (e.g., an optical time domain reflectometer). Similarly, management device 120 may send a signal to AOPP 310-X within central office 130-2 instructing AOPP 310-X to disconnect fiber 2 from carrier equipment 330 and connect fiber 2 to AOPP 310-Y. Management device 120 may further send a signal to AOPP 310-Y instructing AOPP 310-Y to connect fiber 2 to, for example, an optical time domain reflectometer.

Figure 5C:
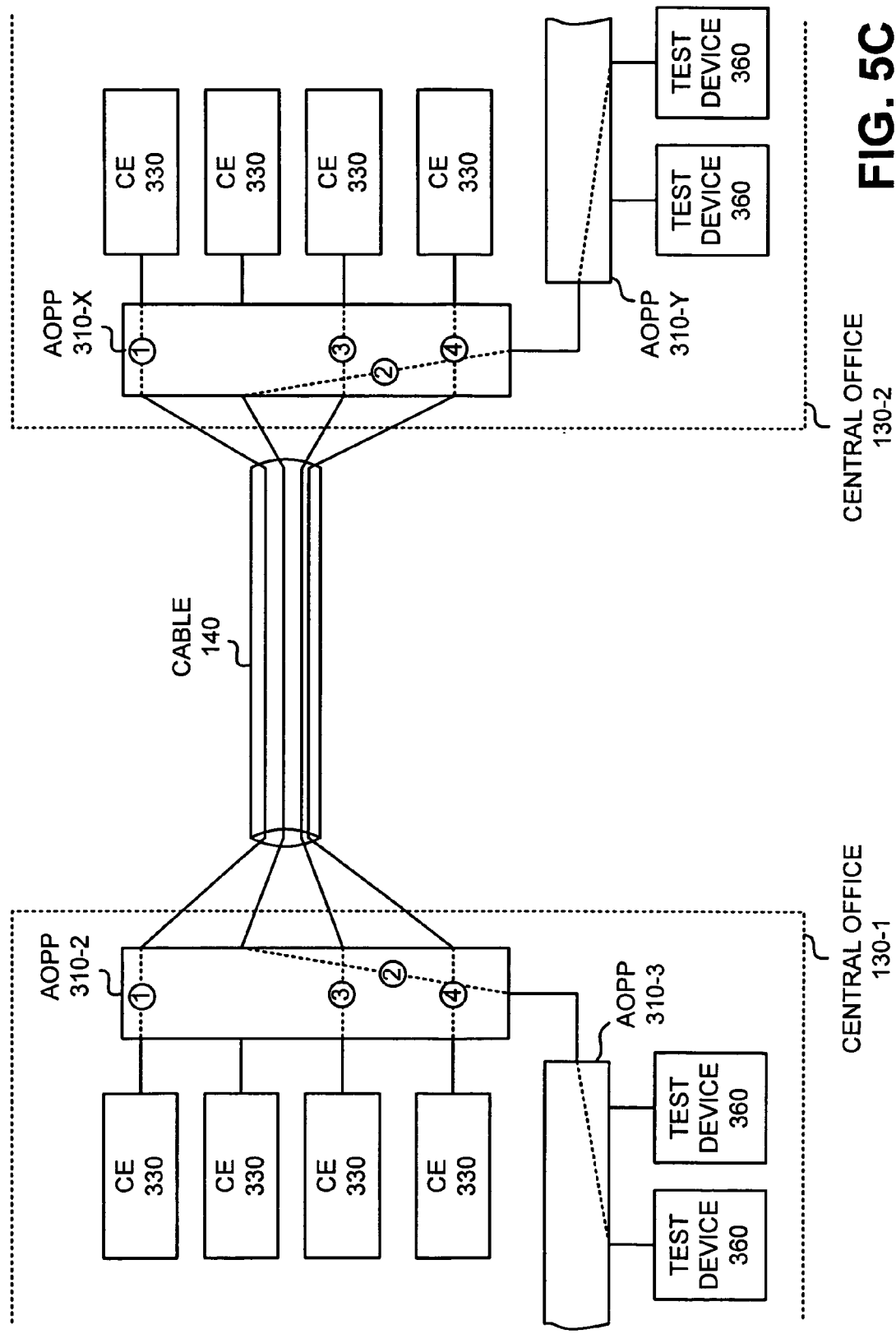

The optical time domain reflectometers at central offices 130-1 and 130-2 may then be used to identify the location of the break in fiber 2. Once the location of the break has been identified, a repair crew may be sent to the identified location to repair fiber 2. Prior to or after repair of fiber 2, it may be desirable to connect other test devices 360 to check, for example, that fiber 2 is operating properly after the repair. In this situation, management device 120 may send a signal to AOPP 310-3 instructing AOPP 310-3 to disconnect fiber 2 from the first test device 360 and connect it to a second test device 360 (e.g., a bit error rate tester), as illustrated in FIG. 5C. Similarly, management device 120 may send a signal to AOPP 310-Y instructing AOPP 310-Y to disconnect fiber 2 from the first test device 360 and connect it to a second test device 360. In this way, different tests can be performed on a particular fiber under the control of a remotely-located management device.

After fiber 2 has been repaired, as will be detected by the test devices at central offices 130-1 and 130-2, and all desired testing has been performed, management device 120 may cause fiber 2 to be disconnected from test devices 360 at central offices 130-1 and 130-2 and reconnected to the appropriate carrier equipment 330, as illustrated in FIG. 5D. For example, management device 120 may send a signal to AOPP 310-2 instructing AOPP 310-2 to disconnect fiber 2 from AOPP 310-3 and re-connect the fiber to carrier equipment 330. Similarly, management device 120 may send a signal to AOPP 310-X instructing AOPP 310-X to disconnect fiber 2 from AOPP 310-Y and re-connect the fiber to carrier equipment 330. The ability to control testing of fibers at central offices 130 via a remote management device 120 greatly reduces the man power required by conventional testing and repair techniques.

Figure 6:
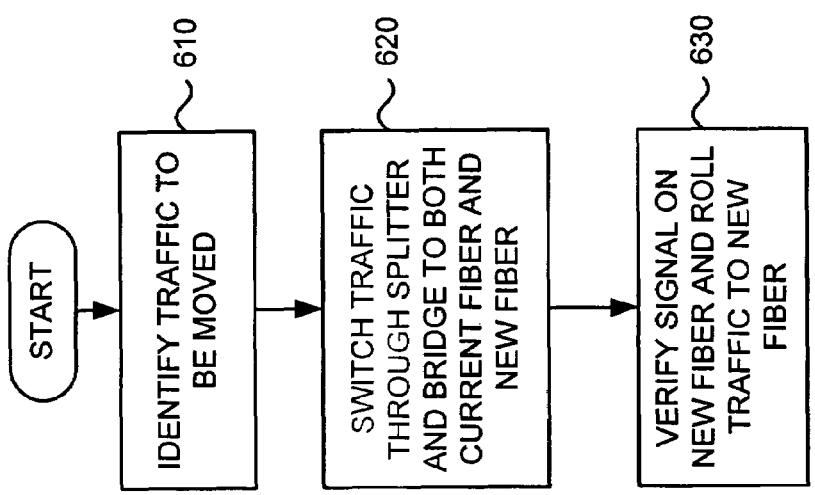
FIG. 6 illustrates an exemplary process for rolling traffic over from one fiber to another fiber in an optical patch panel in an implementation consistent with the principles of the invention.

FIG. 6 illustrates an exemplary process for rolling traffic over from one fiber (referred to herein as the "current fiber")

to another fiber (referred to herein as the "new fiber") in a central office in an implementation consistent with the principles of the invention. Processing may begin by identifying traffic to be moved (act 610). For example, if maintenance is to be performed on the current fiber within a cable, it may be necessary to move the traffic on that fiber to a new fiber within the cable. In this way, traffic will not be interrupted during the maintenance activity performed on the current fiber.

Once the traffic has been identified, the traffic can be switched through a splitter, such as splitter 320 (FIG. 3) and bridged to both the current fiber and the new fiber (act 620). As a result, the current fiber and the new fiber will have the same signal on them.

The receive end of the new fiber may be checked to verify that the signal is received on that fiber (act 630). The receive end of the new fiber refers to the end of the new fiber at the destination central office. The traffic from the current fiber may be rolled to the new fiber (act 630) and the maintenance on the current fiber may be performed. If desirable, after the maintenance has been performed on the current fiber, the traffic from the new fiber may be rolled back to the current fiber in a manner similar to that described above.

Figure 7A:
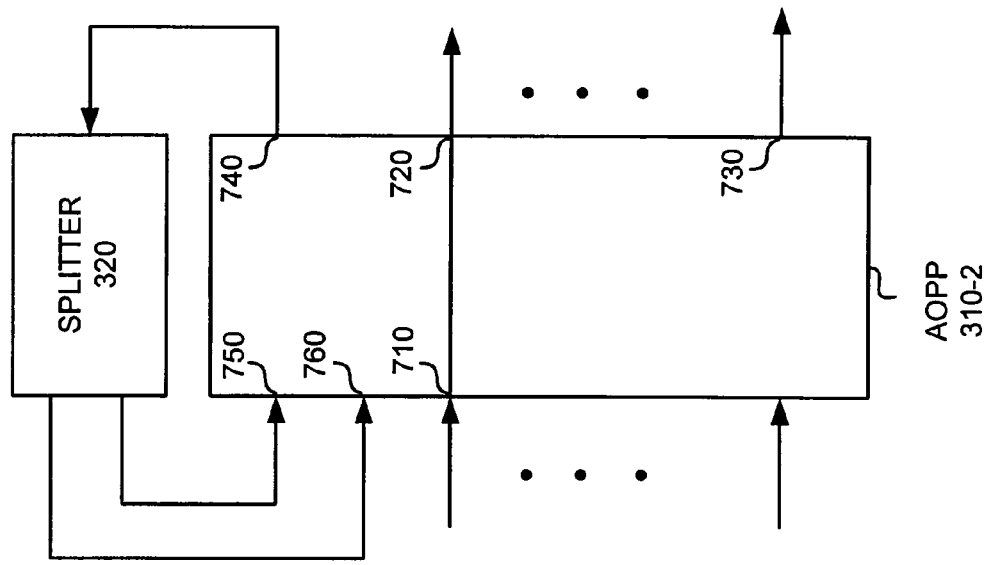
FIGS. 7A-7C illustrate an exemplary implementation of the processing described in FIG. 6 in an implementation consistent with the principles of the invention.

The following example illustrates the processing described above with respect to FIG. 6. As illustrated in FIG. 7A, traffic is patched through AOPP 310-2 from the fiber connected to port 710 of AOPP 310-2 to the output fiber connected to port 720. Due to maintenance reasons, for example, the traffic exiting on the fiber connected to port 720 needs to be moved to another fiber, such as the fiber connected to output port 730 in the example illustrated in FIG. 7A.

Figure 7B:
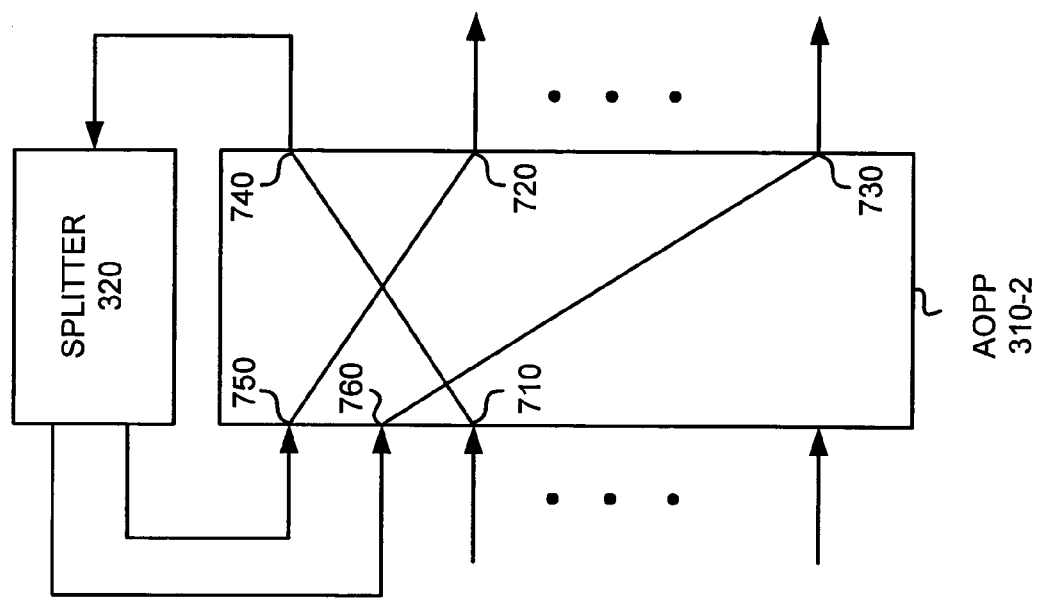

To roll the traffic over to the new fiber, the traffic on input port 710 of AOPP 310-2 may be switched to the port connected to splitter 320 (i.e., port 740), which causes the traffic to be bridged to input ports 750 and 760 of AOPP 310-2, as illustrated in FIG. 7B. Input port 750, which is connected to an output of splitter 320, may be switched to input port 720 (i.e., the current output port). Also, input port 760, which is connected to another output of splitter 320, may be switched to output port 730 (i.e., the new output port). At this time, the fibers connected to both output port 720 and output port 730 have the same traffic on them.

Figure 7C:
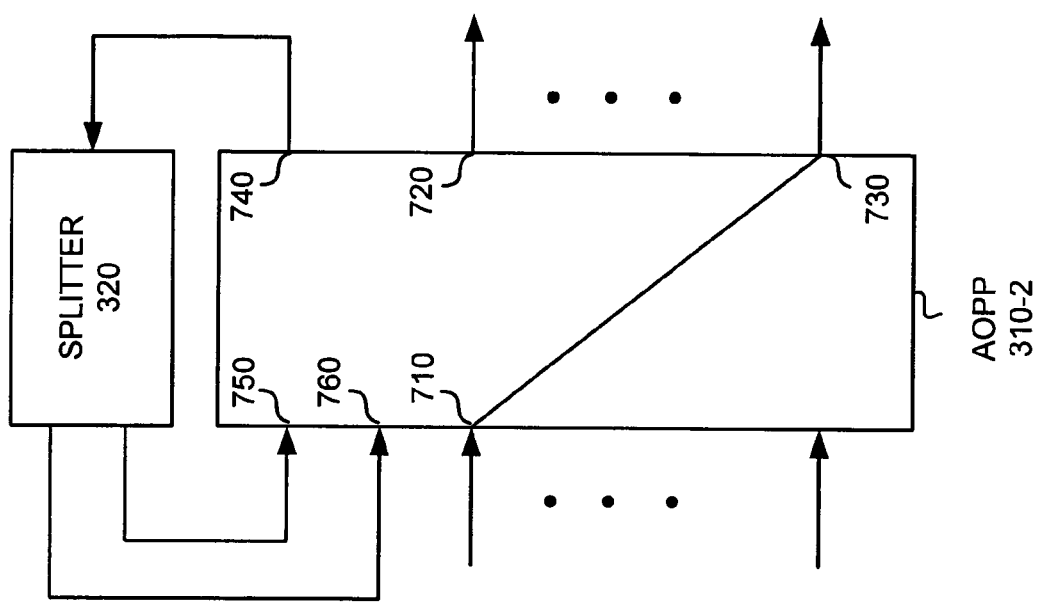

The receive end of the fiber connected to output port 730 may be checked to verify that the signal is present. If the signal is present, indicating that that fiber is operating properly, input port 710 may be switched to output port 730 such that all traffic from input port 710 is only transmitted from output port 730, as illustrated in FIG. 7C. In one implementation consistent with the principles of the invention, management device 120 may instruct central office 130-1 to perform this branch and roll operation.

CONCLUSION

Implementations consistent with the principles of the invention provide remote management of central office operations. In one implementation, a central office is provided with automatic optical patch panels AOPPs that allow for remote surveillance of the fibers associated with the central office and remote testing of those fibers. In one implementation, each cable with which the central office is associated is connected to an individual switch. In this way, failure of a switch does not render the entire central office inoperable. In addition, a splitter may be associated with an AOPP to allow for a bridge and roll capability.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on a remotely located management device 120 controlling operations of a central office, implementations consistent with the invention are not so limited. In other implementations, management device 120 may be located within one or more central offices.

While series of acts have been described with respect to FIGS. 4 and 6, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   detecting that a fiber within a fiber optic cable has failed;
   automatically causing a location of a faulty portion of the fiber to be identified in response to the detecting, where the automatically causing includes:
      switching the fiber to a test device, and
      using the test device to identify the location; and
   remotely causing the fiber to be switched to another test device after using the test device.

2. The method of claim 1 where the automatically causing includes:
   automatically causing a location of a faulty portion of the fiber to be identified based on a signal from a remote network device.

3. The method of claim 1 where the test device includes an optical time domain reflectometer.

4. The method of claim 1 where the fiber connects to an optical patch panel, and
   where the automatically causing includes:
      automatically switching the fiber from a first port to a second port of the optical patch panel.

5. The method of claim 4 where the automatically switching occurs in response to a signal from a remote network device.

6. The method of claim 4 where the automatically switching causes the fiber to be connected to the test device.

7. The method of claim 6 further comprising:
   automatically switching the fiber from the second port of the optical patch panel to the first port.

8. A central office comprising:
- a plurality of automatic optical patch panels (AOPP), each AOPP including:
  - a plurality of optical switches, each optical switch being operably connected to a single, different optical cable associated with the central office; and
- a second AOPP to couple the plurality of AOPPs to a plurality of test devices.

9. The central office of claim 8 where the plurality of test devices includes an optical time domain reflectometer.

10. The central office of claim 8 where the second AOPP is to couple one of the plurality of AOPPs to one of the plurality of test devices in response to a signal from a remote management device.

11. The central office of claim 8 where each of the plurality of AOPPs is to:
- couple an optical fiber connected to the AOPP to the second AOPP in response to a signal from a remote management device.

12. The central office of claim 8 where the plurality of AOPPs and the second AOPP are controlled by a remote management device.

13. The central office of claim 8 further comprising:
- an optical splitter associated with one of the plurality of AOPPs, the optical splitter providing the one AOPP with an ability to roll traffic from a first output optical fiber associated with the one AOPP to a second output optical fiber associated with the one AOPP.

14. A central office comprising:
- a first optical patch panel operably coupled to an optical fiber; and
- a second optical patch panel to couple the first optical patch panel to a test device, the optical fiber being automatically coupled to the test device in response to one or more signals from a remote management device.

15. The central office of claim 14 where the test device is to detect a location of damage along the optical fiber.

16. The central office of claim 15 where the test device detects the location in response to a signal from the remote management device.

17. The central office of claim 14 where the second optical patch panel is further to couple the first optical patch panel to at least one other test device.

18. The central office of claim 17 where the second optical patch panel couples the first optical patch panel to a particular one of the at least one other test device in response to a signal from the remote management device.

19. The central office of claim 14 where the test device includes an optical time domain reflectometer.

20. The central office of claim 14 further comprising:
- an optical splitter coupled to the first optical patch panel, the optical splitter splitting optical signals into first optical signals and second optical signals, the first optical signals and the second optical signals being identical.

21. The central office of claim 20 where the first optical patch panel is operably coupled to a plurality of optical fibers, the first optical patch panel being to:
- switch the optical signals for a first optical fiber of the plurality of optical fibers through the optical splitter, the switching causing the first optical signals to be transmitted over the first optical fiber and the second optical signals to be transmitted over the second optical fiber, and
- switching the optical signals to the second optical fiber.

22. The central office of claim 14 where the first optical patch panel connects to a plurality of fiber optic cables, each fiber optic cable including a plurality of optical fibers, the first optical patch panel including:
- a plurality of optical switches, each optical switch being operably connected to a single fiber optic cable of the plurality of fiber optic cables.

* * * * *